United States Patent [19]
Lambrecht et al.

[11] 3,749,952
[45] July 31, 1973

[54] ROTOR FOR ELECTRIC MACHINES, PARTICULARLY TURBOGENERATORS

[75] Inventors: Dietrich Lambrecht; Erich Weghaupt, both of Mulheim-Ruhr, Germany

[73] Assignee: Kraftwerk Union Aktiengesellschaft, Mulheim-Ruhr, Germany

[22] Filed: Oct. 4, 1971

[21] Appl. No.: 185,967

[30] Foreign Application Priority Data

Oct. 2, 1970 Germany............... G 70 36 500.3

[52] U.S. Cl. .................................. 310/54, 310/64
[51] Int. Cl. ............................................ H02k 9/00
[58] Field of Search .................. 310/52, 54, 57, 58, 310/59, 64

[56] References Cited
UNITED STATES PATENTS

| | | | |
|---|---|---|---|
| 3,131,321 | 4/1964 | Gibbs | 310/54 |
| 3,619,674 | 11/1971 | Daimo | 310/54 |
| 3,569,752 | 3/1971 | Tomlinson | 310/54 |
| 3,543,062 | 11/1970 | Banchieri | 310/54 |
| 3,476,961 | 11/1969 | Heard | 310/54 |
| 3,320,447 | 5/1967 | Banchieri | 310/54 |

*Primary Examiner*—R. Skudy
*Attorney*—Arthur E. Wilfond, Herbert L. Lerner and Daniel J. Tick

[57] ABSTRACT

In the region of the winding heads of a turbogenerator, each of the cross conductors of the individual coil windings extending in the circumferential direction is provided with an axially protruding projection piece. The coolant connection tubes are brought in the peripheral direction to the lateral duct openings of the projection. The radial height of the cross conductors and the axial extension of the projection pieces are in each case at least as large as the hydraulically required outer diameter of the coolant tubes including the minimum wall thickness existing in the projection piece in the vicinity of the connection end of the tube.

4 Claims, 5 Drawing Figures

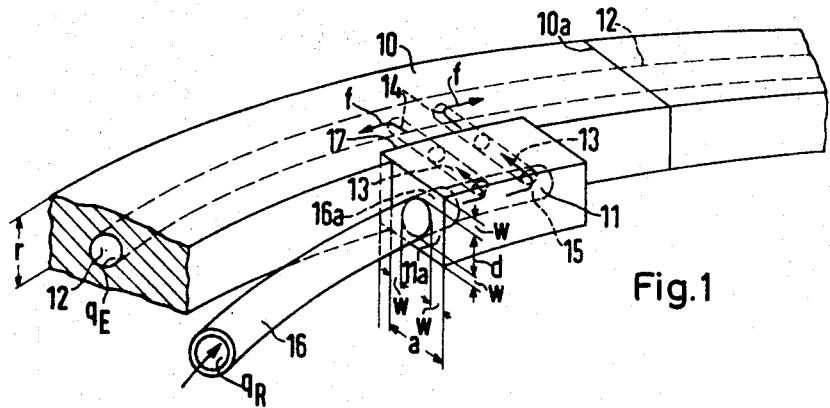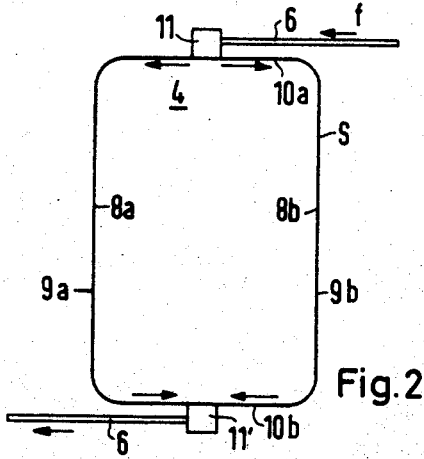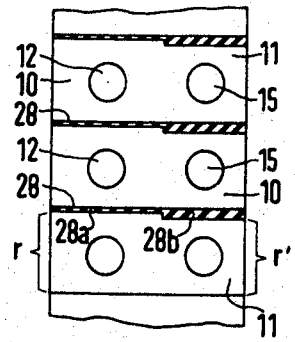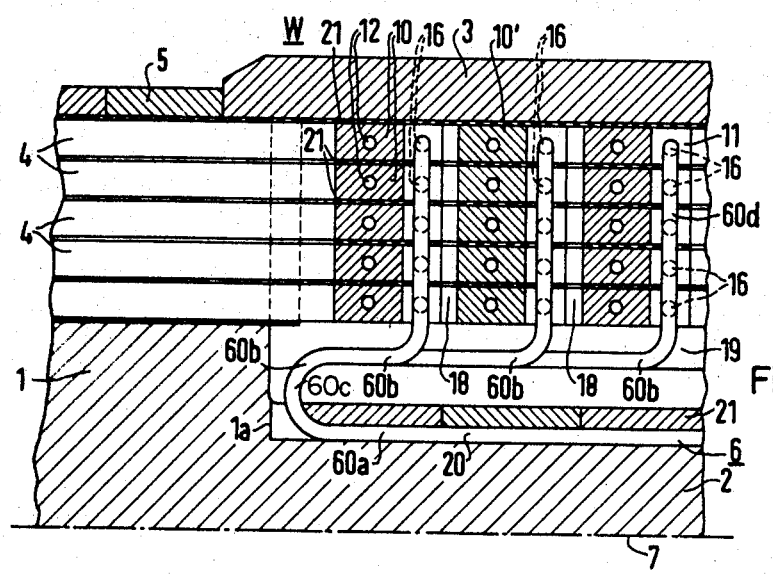

ROTOR FOR ELECTRIC MACHINES, PARTICULARLY TURBOGENERATORS

The invention relates to a rotor for electric machines, particularly turbogenerators. More particularly, the invention rotates to a rotor of an electric machine, in particular a turbogenerator, having an arrangement of coolant connection lines in the region of the cross conductors or transverse conductors of the coil windings. The half-windings each have an internal duct for the coolant liquid and the two internal ducts are in connection, as parallel flow channels, at the junction point with the respective internal duct of a coolant tube via the internal connection ducts or canals of a block-shaped projection piece. The block-shaped projection piece is arranged at the cross conductor and protrudes in the direction of the rotor axis. The coolant tube extends essentially parallel to the cross conductor. An end of the coolant tube is brought to a lateral surface of the projection piece facing the peripheral direction of the rotor and is there connected to the connection ducts.

An arrangement of the aforedescribed type is known which provides that the cross conductor has an axially protruding projection piece. The axial extent and radial thickness of the projection piece is always greater than the radial thickness of the cross conductor. The tube is connected at the projection piece. This arrangement has proven itself well for smooth-core rotors of turbogenerators of medium and large rating, because there are no restraints with regard to the hydraulic diameter of the coolant tubes. In recent years, however, the unit ratings of turbogenerators have increased further to the order of 1,000 megawatts and more for a single shaft tubogenerator set.

Our invention is based on the reasoning that in such large electric machines of the synchronous type, particularly of turbogenerators with smooth-core rotors, the exciter winding and therefore also its cross conductors in the region of the winding head under the winding head enclosure, may be provided with such a large radial dimension that the projection pieces, which receive the coolant tube connections, may be dimensioned in radial extent no larger or, in some cases, even smaller, compared to the radial extent of the cross conductors.

An object of the invention is to provide a rotor for an electrical machine with very good utilization of the space beneath the winding head cap for the projection pieces and associated coolant connection tubes of the cooling system.

Based on the aforedescribed reasoning, the invention consists, in a rotor for electric machines, particularly turbogenerators of the aforementioned type, of the feature that the radial height of the cross conductors and the axial extent of the projection pieces are at least as large as the hydraulically required outside diameter of the coolant tubes, including the minimum wall thickness existing in the projection piece in the vicinity of the tube connection end.

In accordance with the invention, a rotor for a turbogenerator having an axis and coil windings having cross conductors having a radial dimension $r$ and coolant connecting lines in the region of the cross conductor comprises projection pieces having internal connection ducts and a lateral surface facing the circumferential direction of the rotor. The projection pieces are of block shape, located at cross conductors and protruding in the direction of the axis of the rotor for an axial extent $a$. The projection pieces have an opening in the lateral surface spaced from the edges by a radial wall thickness $w$. Coolant tubes have a hydraulically required outer diameter $d$ and an internal duct and a connection end extending substantially parallel to the cross conductors to the lateral surface of the projection pieces and are connected via the opening of the surface to the internal connection ducts of the projection pieces. Each of the coil windings has half-windings each having internal liquid coolant ducts connected as parallel flow ducts at the junction with the internal ducts of coolant tubes via the internal connection ducts of the projection pieces. The radial dimension $r$ of the cross conductors and the axial extent $a$ of the projection pieces are at least as large as the hydraulically required outer diameter $d$ of the coolant tubes including the minimum radial wall thickness $w$ of the projection pieces in the region of the connection end of the coolant tubes.

The rotor includes a rotor body, a rotor shaft extending from the rotor body at a boundary therebetween and having an end, a winding head cap, exciter windings having coil windings and coolant connecting lines having individual lines. The cross conductors are radially positioned on top of each other in cross conductor stacks under the winding head cap. The cross conductor stacks are spaced from each other to form free space between adjacent cross conductor stacks and the cross conductor stacks and are spaced from the end of the shaft to form a free space between the cross conductor stacks and the end of the shaft. The cross conductor stacks corresponding to the coil windings of the exciter windings are concentrically arranged with each other. The coolant tubes have line portions bent in circumferential direction from individual lines of the coolant connecting lines and extending radially in the free space between adjacent cross conductor stacks. The individual lines extend axially at the outer circumference of the end of the shaft in directions toward the rotor body and are bent in elastically deformable reentrant loops of substantially U-shape at the boundary of the rotor body and the shaft with the bent parts of the individual lines of U-shape being in the free space between the cross conductor stacks and the end of the shaft and being bent again into radially extending line parts ending in the coolant tubes.

The cross conductors have recesses formed therein and the projection pieces are fitted into the recesses and are connected to the cross conductors in a liquid tight manner. The ends of the corresponding coil winding are electrically and hydraulically joined together in the regions of the cross conductor junctions.

The cross conductors have sections and the projection pieces comprise formed pieces with part of the cross conductor sections and are connected to the cross conductors by hard solder at each end.

The projection pieces include inlet and outlet projection pieces, the cross conductor stacks have inlet projection pieces and outlet projection pieces and the inlet and outlet projection pieces of the cross conductor stacks are radially positioned on top of each other.

The advantages attainable by the invention are found particularly in the fact that a very good utilization of the space beneath the winding head cap is obtained for the projection pieces and the associated coolant connection tubes. This is because the number of projection pieces of a cross conductor stack situated on top of each other is equal to the number of cross conductors located on top of each other. The thickness of the layers of insulating material between the cross conductors lying on top of each other and the projection pieces can be made equal. The radial height of the projection pieces and the cross conductors is the same. The intermediate layers of insulating material can therefore extend beyond the cross conductors into the gaps between the projection pieces.

In order that the invention may be readily carried into effect, it will now be described with reference to the accompanying drawings, wherein:

FIG. 1 is a perspective view of a section of a cross conductor of the rotor of the invention, having a projection piece and coolant tubes;

FIG. 2 is a schematic diagram of the coolant circuit of a coil winding of the embodiment of FIG. 1, wherein a hot water distribution chamber arranged at the end at the turbine side and hot water return pipes returning to the exciter end via the poles of the rotor are additionally required for feeding and removing the coolant from the same end at the exciter side;

Figure 1A:
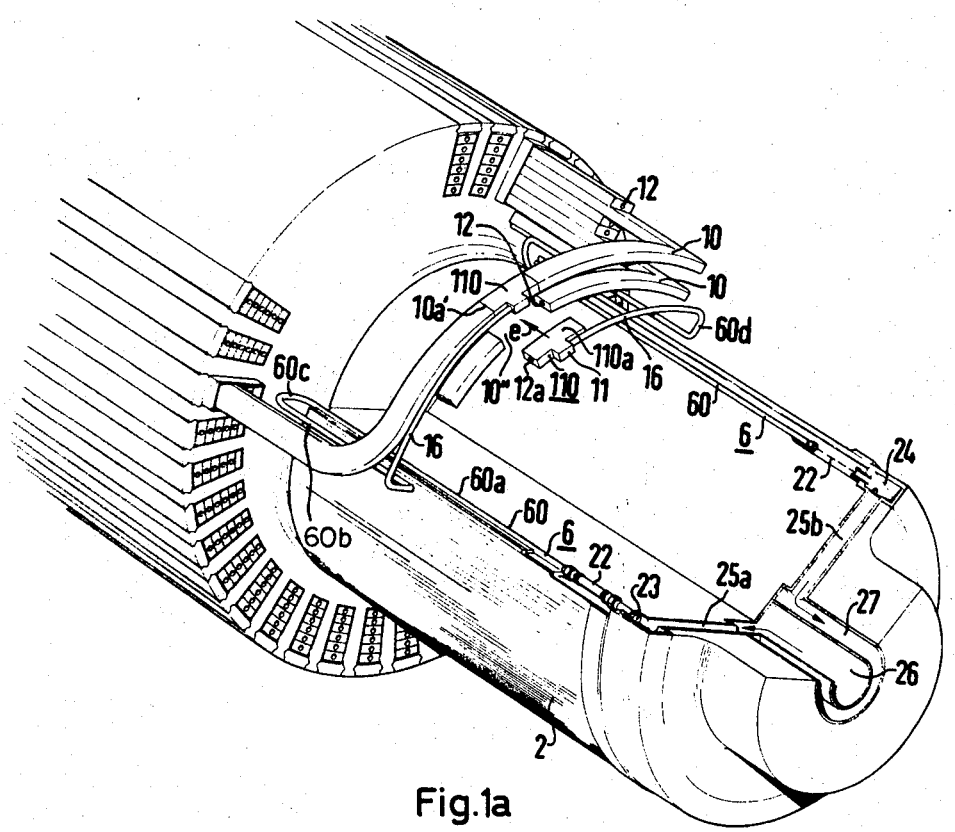
FIG. 1a is a perspective view of part of the rotor of the invention, illustrating a modification of the cross conductor of FIG. 1 and including the coolant feed and discharge duct system, with the rotor cap not yet placed in position, the coolant being fed and removed at the same end of the rotor with respect to the exciter.

FIG. 3 is a sectional view of a section of the coolant connection ducts in the region of the winding head beneath the winding head cap; and FIG. 4 is a modification of the embodiment of part of FIG. 3, on an enlarged scale, in which the radial height of the projection pieces is smaller than that of the cross conductors, the number of projection pieces per cross conductor stack, however, being equal to the number of cross connectors, as in FIG. 3.

In the FIGS., the same components are identified by the same reference numerals.

In FIG. 3, the region W of the winding head of one end of a turbogenerator rotor of the smooth-core type of construction is shown with the beginning part of a body 1. The rotor has a shaft end 2. A cap 3 is shrunk onto the body 1. Exciter conductors 4 are inserted in slots of the body 1. Wedges 5 are inserted in slots at the outer periphery of the exciter conductors 4 or the body 1, as are coolant connecting lines 6. The rotor of the turbogenerator has an axis of rotation 7.

As is shown in FIG. 2, the exciter conductors 4 are in each case led in the form of coil windings S surrounding the rotor poles, which as is known per se are electrically connected in series per pole, but are connected in parallel as far as the coolant is concerned. The coil windings S have two half-windings 8a and 8b, with axially extending winding parts 9a and 9b and winding parts 10a and 10b extending in the peripheral direction. The winding parts 10a and 10b are the cross conductors in the region W of the winding head.

The coolant path is indicated by arrows f in FIG. 1. The coolant is fed from the coolant connecting lines 6 (FIG. 2), via a first projection piece 11 (FIGS. 1 and 2), to the first cross conductor 10a of the coil winding S and divides over the two half-windings 8a and 8b (FIG. 2), each of which has a liquid duct 12 as shown in FIG. 1. After flowing through the two half-windings 8a and 8b, the coolant arrives via the internal ducts or canals of a second projection piece 11' at the connecting lines 6 at the other end of the machine. The coolant in the connecting lines 6 is drawn off by means of a pump and is fed again into the connecting lines 6 of the other end of the machine via suitable coolant supply processing arrangements. However, it is also possible to design the coolant supply so that the feeding and the discharge of the coolant occur in the region W of the winding head, as shown in FIG. 3, and specifically if it flows through one, two, three, etc., full turns (FIG. 1a).

FIG. 1 shows in greater detail that the parallel flow ducts 12 of the cross conductor 10 are connected via internal connection ducts or canals 13 of the projection piece 11. Furthermore, internal connecting ducts or canals 14 of the cross conductor 10, which constitute an extension of said cross conductor, and the internal main connection duct or canal 15 of the projection piece 11, are connected to a coolant connecting tube 16. The end 16a of the small coolant connecting tube, which runs essentially parallel to the cross conductor 10, is brought to the lateral surface 11a of the projection piece 11 which faces in the direction of the circumference of the rotor, and is there connected to the connecting duct 15.

The projection piece 11, which is in the form of a block, is inserted into a suitable recess 17 of the cross conductor 10. The projection piece 11 is soldered or welded to the cross conductor 10 in the region of the matching surface in such a manner that the ducts 14 and 15 are aligned with each other. Thus, there is a connection for the liquid coolant from the main internal duct 15 of the projection piece 11 to the internal duct 12 of the cross conductor 10. The cross conductor 10 has a junction 10a at which the two ends of a correspondingly bent coil winding are soldered or welded to each other with a snug fit. The two ends of the coil winding are preferably soldered to each other at high temperature. The internal duct 12 goes through in the region of the junction 10a.

In the modification of FIG. 1a, a projection piece 11, comprising a formed piece 110, is used with a cross conductor section 110a. The formed piece 110 accordingly has therein not only the ducts 13 and 15, but also the internal connection ducts 14 (not shown in detail in FIG. 1a) and also a segment 12a of the parallel flow ducts 12, as will be seen from a comparison with FIG. 1.

In FIG. 1a, the formed projection piece 110, which is paractically already provided with the coolant connecting tubes 16, is fitted into a recess 10'' of the cross conductor 10 and is connected to said cross conductor by hard soldered connections 10a'. The upper cross conductor 10 shows the assembled condition of the formed projection piece 110. The formed projection piece 110 is shown in its unassembled condition with regard to the lower cross conductor. An arrow e indicates the direction of assembly.

As indicated in FIG. 1, the radial dimension r of the cross conductor 10 and the axial extent a of the projection piece 11 are always at least as large as the hydraulically required outer diameter d of the tube 16 including the minimum radial wall thickness w of said projection piece in the vicinity of the tube connecting end 16a. As shown in FIG. 1, the cross conductor 10 and, therefore, the entire coil winding S or the exciter conductors 4 have a relatively large radial dimension r which is required to accommodate the exciter currents required for large turbogenerators.

The cross-section of the internal coolant ducts 12 of the exciter conductors covers a relatively small area of the cross-section of the exciter conductor, but is large enough to provide the required hydraulic diameter for the flow of the necessary quantity of coolant per unit time through said internal ducts. The radial dimension $r$ of the exciter conductors 4 or the cross conductor 10 is so large that the associated projection piece 11, which has the same radial dimension $r$ in the modifications of FIGS. 1, 1a and 3, can accommodate or accept a coolant tube 16 without difficulty. The coolant tube 16 has an effective or coolant cross-section $q_R$ which is about twice as large as the effective or coolant cross-section $q_E$ of the internal ducts 12. The arrows $f$ illustrate the flow of the coolant of FIG. 1.

As shown in FIG. 3 in conjunction with FIG. 1a, the cross conductors 10 are radially on top of each other under the winding head cap 3 in the form of cross conductor stacks 10'. The cross conductor stacks 10' belong to the coil windings S which are arranged concentrically with respect to each other. The coolant tubes 16 are individual lines 60 extending radially in the circumferential direction in the free space between adjacent cross connection stacks 10' of the lines branching off from the coolant connecting lines 6. The individual lines 60 are led with a first line part 60a axially at the outer circumference of the shaft end 2, first in the direction toward the body 1 up to its beginning 1a. The lines 60 are bent at the body boundary 1a into approximately U-shape (60c FIG. 1a) with a second line part 60b, from the line part 60a.

The second line part 60b is the outer leg of the U 60c and extends in the free space 19 between the cross conductor stacks 10' and the shaft end 2. The second line part 60b first extends parallel to the axis and is then bent into a radially extending third line portion 60d passing into the coolant tubes 16. The projection pieces 10 which, in accordance with the foregoing discussion, may either be feed or discharge projection pieces of the cross conductor stack 10' in question, are arranged radially on top of each other or aligned. The individual line parts 60a are arranged or distributed at the outer circumference of the shaft end 2 (FIG. 1a). The individual line parts 60a are installed in slots 20 at the outer circumference of the shaft and said slots are closed by wedges 21 (FIG. 3).

An individual line 60 is associated with each coolant connecting tube 16, as shown in detail in FIG. 1a. The individual lines 60 are connected, in the embodiment of FIG. 1a, via insulating sections 22, either to feed distribution chanbers 23 or to discharge distribution chambers 24. The distribution chambers 23 and 24 are arranged at the outer circumference of the shaft end 2 and are sealed against each other by partitions (not shown in FIG. 1a). The distribution chambers 23 and 24 are connected via radial liquid ducts 25a either to a central feed shaft duct 26 (distribution chambers 23) or via radial shaft ducts 25b to a discharge shaft canal 27 arranged concentrically with respect to said feed shaft duct (distribution chambers 24).

A cooling path ratio of $k = 2$ is realized. That is, the coolant, after entering through a first projection piece, pointing with its tube 16 in a counterclockwise direction, passes through the cooling path of a full winding and then leaves the cooling ducts via a second projection piece. The coolant tube 16 of the second projection piece points in the clockwise direction on the same side of the machine. In FIGS. 2 and 3, however, a cooling path ratio $k = 1$ is realized. That is, the coolant flows between intake and outlet through the respective cooling path of one half-winding, and the first and second projection pieces are located on different sides of the machine. The flow through the projection pieces (FIG. 3) via their coolant tubes 16 may always occur from the same peripheral direction.

FIG. 4 shows a modification in which the radial dimension $r'$ of the projection piece 11 is smaller than the radial dimension $r$ of the cross conductors 10. Accordingly, layers 28 of insulating material between the cross conductors, which are on top of each other, and the projection pieces 11 comprise thinner layers 28a between the cross conductors and thicker layers 28b between the projection pieces. The intermediate layers 28 of insulation must naturally be so dimensioned and must consist of a material which is such that the centrifugal force-dependent pressure forces between adjacent cross conductors and projection pieces can be accommodated uniformly between them and with respect to the cap 3. A suitable insulating material is, for example, glass fiber reinforced epoxy resin.

While the invention has been described by means of specific examples and in specific embodiments, we do not wish to be limited thereto, for obvious modifications will occur to those skilled in the art without departing from the spirit and scope of the invention.

We claim:

1. A rotor for a turbogenerator, comprising a rotor body having axial slots, a rotor shaft extending from the rotor body at a boundary therebetween, liquid-cooled, half turn windings having axial conductors disposed in said rotor slots and cross conductors extending between said axial conductors, said cross conductors being radially positioned on top of each other in cross conductor stacks, said cross conductor stacks being axially spaced from each other to form free spaces between adjacent cross conductor stacks, each of said cross conductors having a block-shaped nose connector having internal ducts providing a path for coolant to and from said cross conductors, each of said nose connectors projecting in an axial direction beyond the axial side of said cross conductors into said free space between adjacent cross conductor stacks, a cooling liquid chamber disposed about said rotor shaft, coolant tubes leading from said liquid chamber to said nose connectors, said coolant tubes having a first portion extending generally axially from said chamber to said boundary between said rotor body and rotor shaft, said coolant tubes having a second U-shaped elastically deformable portion which extends the coolant tube in an opposite axial direction, said first and second portions being disposed radially inwardly of the most radially inwardly disposed cross conductor, said coolant tube having a third portion extending radially into said free space between adjacent cross conductor stacks, said coolant tube having a fourth portion extending generally parallel to said cross conductors for connection to a respective nose connector disposed in said free space between adjacent cross connector stacks, the radial dimension $r$ of said cross conductors and the axial extent $a$ of said nose connectors being at least as large as the outer diameter $d$ of said coolant tubes including the minimum radial wall thickness $w$ of the nose connector in the region of the connection end of the coolant tube to its respective nose connector.

2. A rotor as claimed in claim 6, wherein the cross conductors have recesses formed therein and said block-shaped nose connectors are fitted into the recesses and are connected to the cross conductors in a liquid tight manner, and the ends of the corresponding coil winding are electrically and hydraulically joined together in the regions of the cross conductor junctions.

3. A rotor as claimed in claim 6, wherein the cross conductors have sections and the block-shaped nose connectors comprise formed pieces with part of the cross conductor sections and are connected to the cross conductors by hard solder at each end.

4. A rotor as claimed in claim 6, wherein said block-shaped nose connectors include inlet and outlet means, said inlet and outlet means of the cross conductor stacks being radially positioned on top of each other.

* * * * *